US012581024B2

(12) United States Patent
Murakami et al.

(10) Patent No.: US 12,581,024 B2
(45) Date of Patent: Mar. 17, 2026

(54) IMAGE PROCESSING DEVICE AND IMAGE PROCESSING METHOD

(71) Applicant: Faurecia Clarion Electronics Co., Ltd., Saitama (JP)

(72) Inventors: Tetsuro Murakami, Saitama (JP); Naoto Sakata, Saitama (JP); Masashi Koga, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 90 days.

(21) Appl. No.: 18/531,998

(22) Filed: Dec. 7, 2023

(65) Prior Publication Data

US 2024/0214510 A1     Jun. 27, 2024

(30) Foreign Application Priority Data

Dec. 22, 2022     (JP) ................................. 2022-205406

(51) Int. Cl.
H04N 5/262          (2006.01)
B60R 1/22           (2022.01)
          (Continued)

(52) U.S. Cl.
CPC ............. H04N 5/2628 (2013.01); B60R 1/22 (2022.01); G06F 3/013 (2013.01); G06T 7/73 (2017.01);
          (Continued)

(58) Field of Classification Search
None
See application file for complete search history.

(56) References Cited

U.S. PATENT DOCUMENTS 8,179,435 B2     5/2012  Akatsuka et al.
9,135,754 B2 *   9/2015  Ng-Thow-Hing ... G01C 21/365
          (Continued)

FOREIGN PATENT DOCUMENTS

JP          2006224700 A      8/2006
JP          2007096638 A      4/2007
          (Continued)

OTHER PUBLICATIONS

Land Rover ClearSight Ground View | Land Rover White Plains; https://www.landroverwhiteplains.com/research/clearsight-ground-view.htm.
          (Continued)

*Primary Examiner* — Talha M Nawaz
(74) *Attorney, Agent, or Firm* — Reising Ethington P.C.

(57)          ABSTRACT

An image processing device that enables an occupant of a mobile body, such as a vehicle, to intuitively understand the relationship between an outside image displayed on a display device and an eye position. The device includes: a 3D position information acquisition unit that acquires information on the position of an occupant's eye; an image acquisition unit that acquires an outside image; a cropping unit that crops a region image from the outside image, based on the eye position information; a projection image generation unit that generates a projection image of a 3D model having an opening, as viewed from the position of the eye; an image compositing unit that composites the region image and the projection image such that the region image appears in the opening of the projection image on the screen; and an image output unit that outputs a composite image to the display device.

14 Claims, 14 Drawing Sheets

(51) Int. Cl.

| | |
|---|---|
| *G06F 3/01* | (2006.01) |
| *G06T 7/73* | (2017.01) |
| *G06T 17/00* | (2006.01) |
| *G06V 20/58* | (2022.01) |
| *G06V 20/59* | (2022.01) |
| *H04N 7/18* | (2006.01) |

(52) U.S. Cl.
CPC .............. *G06T 17/00* (2013.01); *G06V 20/58* (2022.01); *G06V 20/59* (2022.01); *H04N 7/183* (2013.01); *B60R 2300/304* (2013.01); *G06T 2207/30201* (2013.01); *G06T 2207/30252* (2013.01); *G06T 2207/30268* (2013.01); *G06T 2210/22* (2013.01); *G06T 2210/44* (2013.01)

(56) References Cited

U.S. PATENT DOCUMENTS

| | | | | |
|---|---|---|---|---|
| 10,901,528 | B2* | 1/2021 | Wang | .................... G06F 3/04883 |
| 2012/0188282 | A1* | 7/2012 | Li | ........................ G06F 3/04845 |
| | | | | 345/649 |

| | | | | |
|---|---|---|---|---|
| 2013/0293582 | A1* | 11/2013 | Ng-Thow-Hing | .... G06T 19/006 |
| | | | | 345/633 |
| 2017/0282796 | A1 | 10/2017 | Kosaki | |
| 2019/0226851 | A1* | 7/2019 | Nicosevici | .............. G06F 18/28 |
| 2020/0086791 | A1* | 3/2020 | Hardy | ........................ G06T 5/50 |
| 2020/0225473 | A1* | 7/2020 | Selan | ...................... G06F 3/017 |
| 2020/0359007 | A1* | 11/2020 | Izumi | .................. H04N 13/111 |
| 2023/0032367 | A1* | 2/2023 | Ohira | .................. G05D 1/0246 |

FOREIGN PATENT DOCUMENTS

| | | |
|---|---|---|
| JP | 2010109684 A | 5/2010 |
| JP | 2017188744 A | 10/2017 |

OTHER PUBLICATIONS

Continental Enhances Driver Safety by Eliminating Forward Blind Spots—Continental AG; https://www.continental.com/en/press/press-releases/2018-10-25-virtual-a-pillar/.

Continental Automotive—AR-HUD (continental-automotive.com).

English Translation of Continental Automotive—AR-HUD (continental-automotive.com).

\* cited by examiner

START

Acquire eye-point coordinate PV ~S101

Generate window frame image $F_{IMG}$ ~S102

Acquire exterior image $P_{40}$ ~S103

Generate region image $R_{IMG}$ ~S104

Generate composite image $C_{IMG}$ ~S105

Output composite image $C_{IMG}$ to display device 60 ~S106

END

IMAGE PROCESSING DEVICE AND IMAGE PROCESSING METHOD

TECHNICAL FIELD

The present invention relates to an image processing device and image processing method.

BACKGROUND

An image processing device capable of displaying an image that expands the field of vision of a driver is known. A specific configuration of an image processing device is described in, for example, Patent Document 1 (JP 2007096638 A).

The image processing device described in Patent Document 1 converts to coordinates a captured image of the outside of a vehicle by an image capture device, such that an image equivalent to a case where the installation region of a display device is transparent from the eye-point of the driver and the outside of the vehicle is visible is displayed on the screen of the display device.

However, with the image processing device described in Patent Document 1, the occupant can only perceive the image displayed on the flat screen as a flat image. This makes it difficult for the occupant to intuitively understand the relationship between their eye position and the displayed image. For example, it is difficult for the occupant to adjust their eye position such that the image of the outside they wish to see is visible through the screen.

In view of the foregoing, an object of the present application is to provide an image processing device and an image processing method that enables an occupant to intuitively understand the relationship between the outside image of a mobile body displayed on a screen of a display device and an eye position.

SUMMARY

An image processing device, according to one embodiment, may include: an eye position information acquisition unit that acquires information of the position of an eye of an occupant of a mobile body; an image acquisition unit that acquires an outside image of the outside of the mobile body; a cropping unit that crops a region image of a region displayed on a screen of a display device provided in the mobile body from the outside image acquired from the image acquisition unit, based on the eye position information; a projection image generation unit that generates a projection image of a 3D model having an opening, as viewed from the position of the eye on the screen; an image compositing unit for compositing the region image and the projection image such that the region image appears in the opening of the projection image on the screen; and an image output unit that outputs a composite image of the image compositing unit to the display device.

According to one embodiment, an image processing device and an image processing method are provided, which enable an occupant to intuitively understand the relationship between the outside image of a mobile body that is displayed on a screen of a display device and an eye position.

BRIEF DESCRIPTION OF THE DRAWINGS

FIG. 2 is a diagram schematically showing an area around a driver seat of a vehicle in which the display control system according to one embodiment is incorporated;

FIG. 4 is a diagram describing an operation of the image processing device according to one embodiment;

FIG. 11 is a diagram supplementing a description of the processes of steps S105C to S105D in FIG. 10;

FIG. 12 is a diagram showing an area around a driver seat of a vehicle according to Modified Example 1;

FIG. 14 is a diagram showing an area around a driver seat of a vehicle according to Modified Example 2.

DETAILED DESCRIPTION OF EMBODIMENTS

Figure 1:
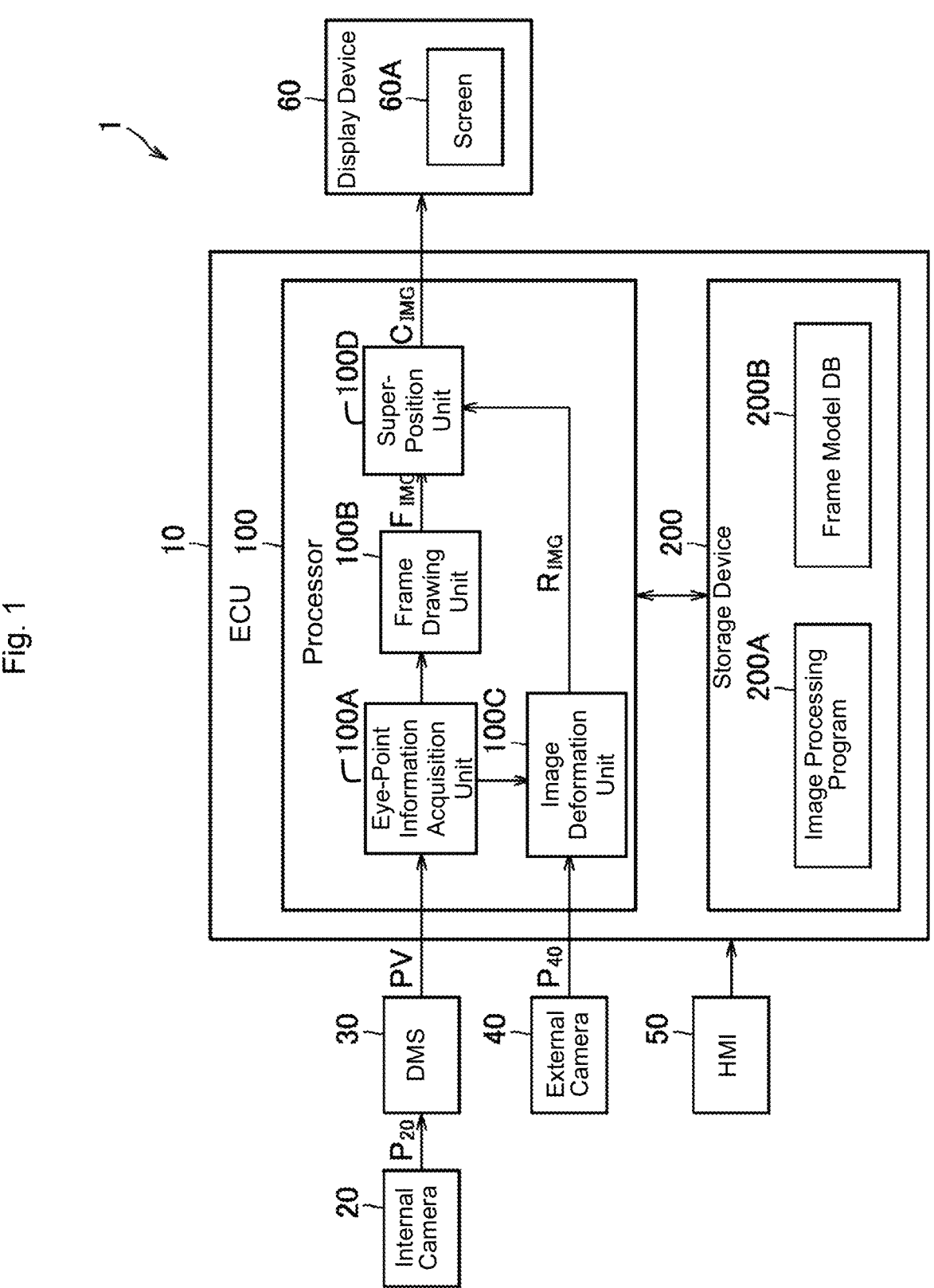
FIG. 1 is a block diagram showing a configuration of a display control system according to one embodiment of the present application.

The following description relates to an image processing device, an image processing method, and an image processing program according to one embodiment of the present application. Note that common or corresponding elements are marked with the same or similar reference numerals, and duplicate descriptions are simplified or omitted as appropriate.

FIG. 1 is a block diagram showing a configuration of a display control system 1 according to one embodiment. As shown in FIG. 1, the display control system 1 is provided with an ECU (Electronic Control Unit) 10, an internal camera 20, a DMS (Driver Monitoring System) 30, an external camera 40, an HMI (Human Machine Interface) 50, and a display device 60. Note that in FIG. 1, the main components necessary for the description of the present embodiment are shown, and some components, such as a housing and the like, for example, are omitted from the drawing as appropriate.

The display control system 1 is a system incorporated in a vehicle (an example of a mobile body) traveling on a road. Note that the configuration shown in FIG. 1 is only one example. For example, the DMS 30 may be incorporated into the ECU 10. In other words, there is a high degree of freedom in the form of the display control system 1, and various design changes are possible.

The ECU 10 is an example of an image processing device and has a processor 100 and a storage device 200. Note that the ECU 10 may be a navigation device or a device that forms part of an in-vehicle infotainment (IVI). Furthermore, the image processing device is not limited to an on-board device such as the ECU 10. The image processing device may be in another form such as a smartphone, feature phone, tablet terminal, personal computer (PC), personal digital assistant (PDA), portable navigation device (PND), handheld game device.

The processor 100 executes an image processing program 200A stored in the storage device 200. In other words, the processor 100 is an example of a computer that executes the image processing program 200A.

The processor 100 is provided with RAM (Random Access Memory), flash ROM (Read Only Memory), and other electric devices and it controls the entire display control system 1. For example, the processor 100 deploys various programs, including the image processing program 200A stored in the storage device 200, on the RAM serving as a work area and controls the display control system 1 in accordance with the deployed programs.

The image processing program 200A stored in the storage device 200 causes the processor 100, which is an example of a computer, to perform the following series of processes: a process for acquiring information on the eye-point (herein, the eye position is referred to as "eye-point") of an occupant of a mobile vehicle; a process for acquiring an outside image of the outside of the mobile body and cropping, from the acquired outside image, a region image of a region displayed on a screen of a display device provided inside the mobile body, based on the eye-point information; a process for generating a projection image of a 3D model having an opening, as viewed from the eye-point at a position on the screen; and a process for compositing the region image and the projection image such that the region image appears in the opening of the projection image on the screen, and outputting the composite image to the display device.

In other words, the image processing program 200A causes the processor 100 to execute an image processing method that includes the above series of processes.

Figure 2:
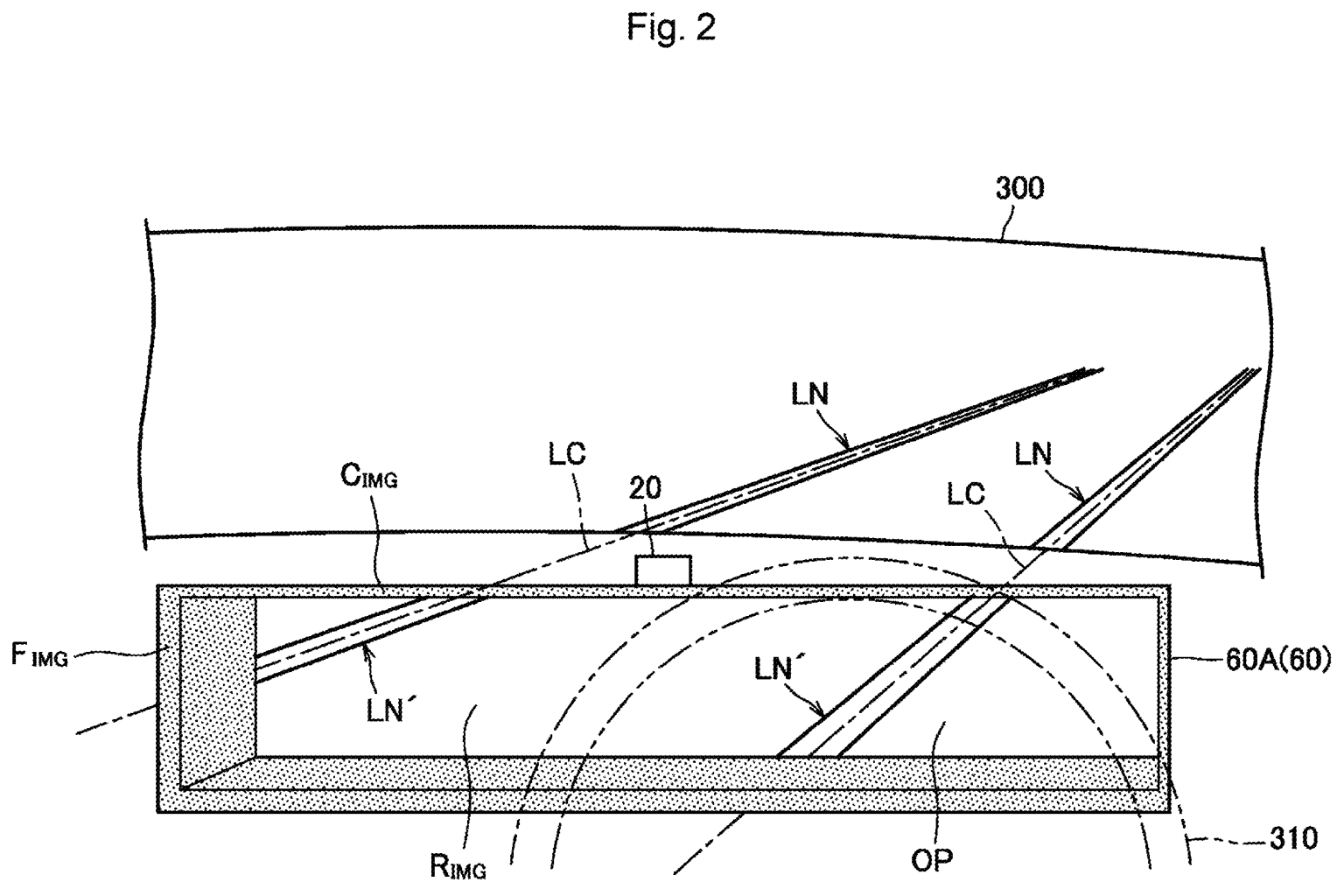

FIG. 2 is a diagram schematically showing an area around a driver seat of a vehicle in which the display control system 1 is incorporated. FIG. 2 shows a part of a vehicle interior as viewed from an occupant seated in the driver seat (referred to as "occupant 2" for convenience). As shown in FIG. 2, the vehicle is provided with the internal camera 20, the display device 60, a front window 300, and a steering wheel 310.

The internal camera 20 is installed near the display device 60, for example. The internal camera 20 captures an image of the occupant 2 seated in the driver seat for example.

The DMS 30 performs face recognition and eye-point detection of the occupant 2 using an interior image $P_{20}$ captured by the internal camera 20. By way of example, the DMS 30 uses known image recognition technology to recognize the position of the face of the occupant 2, the orientation of the face, each part of the face including the eyes, a motion of the occupant 2 with respect to the face, and the like. The motion of the occupant 2 related to the face includes winking and nodding for example.

The DMS 30 uses the results of face recognition to detect 3D-point coordinate PV, which is the eye position of the occupant 2, and outputs the coordinate to the processor 100. The eye-point coordinate PV may be the coordinate of a dominant eye (right or left) of the occupant 2, or may be the midpoint of a line segment connecting the left and right pupils. The occupant 2 can designate his/her own dominant eye beforehand by operating the HMI 50 for example. Note that the DMS 30 may directly detect the eye-point coordinate PV of the occupant 2 from the interior image $P_{20}$ without using the results of face recognition. Conversely, the DMS 30 may detect the coordinate of the occupant's parts and facial contours other than the eye position, and estimate a standard eye position relative thereto as the eye-point coordinate PV of the occupant 2.

The external camera 40 captures an image of the outside of the vehicle. By way of example, the external camera 40 captures an image of the ground at least in front of the occupant 2 and behind an area that the occupant 2 sees through the front window 300. For example, an exterior image $P_{40}$ (an example of an outside image), which is a captured image, is an image of the outside of the vehicle, on an opposite side from the occupant 2 across the display device 60. The external camera 40 outputs the exterior image $P_{40}$ to the processor 100.

The external camera 40, which is an example of an image capture device, may be a camera provided with a wide-angle lens and capable of capturing a wide angle of view in order to capture a wide range. The external camera 40 may be configured of a single camera or a plurality of cameras.

In the HMI 50, various user interfaces of hardware, software, or a combination thereof are assumed. By way of example, the HMI 50 is a mechanical switch key or remote controller installed on a dashboard. When the display device 60 is equipped with a touch panel, the graphical user interface (GUI) provided in a touch panel environment also forms a part of the HMI 50. The occupant 2 can operate the display control system 1 via the HMI 50.

The display device 60 is, for example, a liquid crystal display (LCD) with a touch panel and is installed on the dashboard in front of the steering wheel 310. The display device 60 is not limited to LCDs, but may be another form of display device, for example, an organic EL (Electro Luminescence) display or the like.

As described in detail later, the following process is performed by executing the image processing program 200A. A region image $R_{IMG}$ displayed on a screen 60A of the display device 60 is cropped from the exterior image $P_{40}$ according to the eye-point coordinate PV. A projection image (window frame image $F_{IMG}$) of a window frame model (an example of a 3D model having an opening) is generated, as viewed from the eye-point coordinate PV at a position on the screen 60A. The region image $R_{IMG}$ and the window frame image $F_{IMG}$ are combined such that the region image $R_{IMG}$ appears in an opening OP (region enclosed by a window frame) of the window frame image $F_{IMG}$ on the screen 60A, and the composite image $C_{IMG}$ is output to the display device. This process results in the composite image $C_{IMG}$ shown in FIG. 2 being displayed on the screen 60A.

In the example in FIG. 2, two straight lines LN are provided on the ground in front of the vehicle. In the present embodiment, a highly accurate composite image $C_{IMG}$ is displayed on the screen 60A according to the eye-point of the occupant 2. Therefore, as shown in FIG. 2, each line LN, which is visible via the front window 300, and each line LN', which is displayed on the screen 60A, are aligned in a straight line. The occupant 2 can see, via the screen 60A, a region that cannot be seen directly, which is a blind spot.

In FIG. 2, the center line of each line LN is marked with the reference code LC. As shown in FIG. 2, the center line LC of each line LN coincides with the center line of each line LN' displayed on the screen 60A. Each line LN, LN' appears to be a continuous straight line, and therefore, the region image $R_{IMG}$ on the screen 60A can be perceived by the occupant 2 as a natural image.

In other words, the angle of the window frame model projected on the screen 60A changes according to the eye-point of the occupant 2. For example, if the driver moves their body to the right side to view the screen 60A, the range of the region image $R_{IMG}$ displayed on the screen 60A moves closer to the left side of the vehicle and at the same time, the angle of the window frame model (in other words, the window frame image $F_{IMG}$) changes to the angle viewed from the left side.

In the present embodiment, the combination of changes in the region image $R_{IMG}$ and the window frame image $F_{IMG}$ in response to the shift in eye-point allows the occupant 2 to intuitively understand the relationship between the eye position and the displayed image, and to intuitively recognize the landscape outside the vehicle on the screen 60A as the actual landscape. Therefore, the occupant 2 can intuitively and easily adjust the position of their eye such that the image of the outside they wish to see is visible via the screen 60A. The occupant 2 can experience a state of viewing the outside of the vehicle via the window frame on the dashboard.

Thus, execution of the image processing program 200A allows the occupant 2 to perceive the outside image of the vehicle displayed on the screen 60A of the display device 60 as a natural image.

The ECU 10 includes, as functional blocks, 3D-point information acquisition unit 100A, a frame drawing unit 100B, an image deformation unit 100C, and a superposition unit 100D. Each functional block is realized by the image processing program 200A executed by the processor 100. Each functional block may be partially or wholly implemented by hardware such as a dedicated logic circuit, or the like.

The eye-point information acquisition unit 100A acquires information pertaining to the eye-point of the occupant 2. By way of example, the eye-point information acquisition unit 100A acquires the eye-point coordinate PV from the DMS 30. The eye-point coordinate PV may be set, for example, by an operation on the HMI 50 by the occupant 2. In this case, the DMS 30 can be omitted from the display control system 1.

The frame drawing unit 100B reads the window frame model from a frame model DB (Data Base) 200B stored in the storage device 200. The window frame model is an example of a model that mimics a frame enclosing the screen 60A. Note that the window frame model may be provided on a network instead of locally, for example. In this case, the frame drawing unit 100B accesses the frame model DB on the network via a mobile body wireless communication unit (not shown) to download the window frame model.

The frame drawing unit 100B generates a window frame image $F_{IMG}$ (an example of a projection image) of the window frame model, as viewed from the eye-point of the occupant 2 (eye-point coordinate PV) at a position on the screen 60A, and deforms the shape of the generated window frame image $F_{IMG}$ (an example of a frame shape) to match the shape of the screen 60A (rectangular in the present embodiment).

The image deformation unit 100C crops the region image $R_{IMG}$ displayed on the screen 60A from the exterior image P 40 according to the eye-point of the occupant 2 (eye-point coordinate PV). As a supplement, the image deformation unit 100C crops the projection range of the exterior image $P_{40}$ projected on the screen 60A when the eye-point of the occupant 2 is set as the projection center, as the region image $R_{IMG}$. The image deformation unit 100C deforms the cropped region image $R_{IMG}$ to match the shape of the screen 60A (rectangular in the present embodiment).

The image deformation unit 100C may perform image correction processing to correct wide-angle lens distortion of the external camera 40 as preprocessing to crop the region image $R_{IMG}$ from the exterior image $P_{40}$. Wide-angle lens distortion includes various types of aberrations, such as distortion aberration, chromatic aberration, and the like for example.

The superposition unit 100D generates the composite image $C_{IMG}$ by compositing the region image $R_{IMG}$ and the window frame image $F_{IMG}$ such that the region image $R_{IMG}$ appears in the opening OP of the window frame image $F_{IMG}$ on the screen 60A, as shown in FIG. 2.

FIGS. 3 to 7 are diagrams for describing operations of the frame drawing unit 100B and the image deformation unit 100C.

Figure 3:
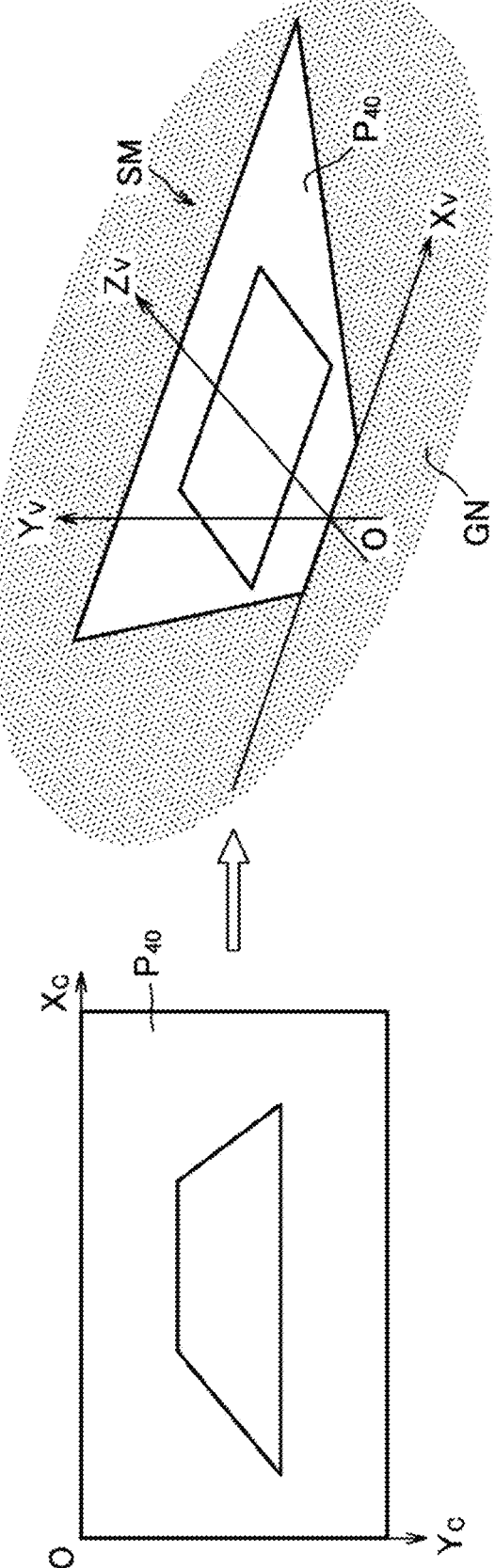
FIG. 3 is a diagram describing an operation of an image processing device according to one embodiment.

In FIG. 3, the image coordinate system is indicated by two axes, $X_C$ on the horizontal axis and $Y_C$ on the vertical axis. The image coordinate system is a coordinate system based on the composite image $C_{IMG}$, and is a two-dimensional coordinate system with the origin O at the upper left corner of the composite image $C_{IMG}$. The unit for each axis is pixels (px).

In FIG. 3, the vehicle coordinate system is indicated by the three axes $X_V$, $Y_V$, and $Z_V$. The vehicle coordinate system is a coordinate system based on the vehicle in which the display control system 1 is incorporated, and is a 3D coordinate system with the position where the vehicle is located as the origin O. The axis $X_V$ extends in a vehicle width direction. The axis $Y_V$ extends in a vehicle up-down direction. The axis $Z_V$ extends in a vehicle front-rear direction. The unit for each axis is millimeters (mm).

In FIG. 3, a set plane SM is, for example, the ground on which the vehicle travels (traveling surface).

The image deformation unit 100C calculates a projection conversion matrix M. The projection conversion matrix M is an example of a projection conversion matrix for mapping the exterior image $P_{40}$ onto the set plane SM (such that the coordinate of the $Y_V$ axis is at a height corresponding to the ground). In FIG. 3, for convenience, a region outside the exterior image $P_{40}$ (region where an image in the exterior image $P_{40}$ is not mapped) is hatched (see reference code GN).

The image deformation unit 100C calculates a reference range (of the traveling surface) to be displayed on the screen 60A.

Figure 4:
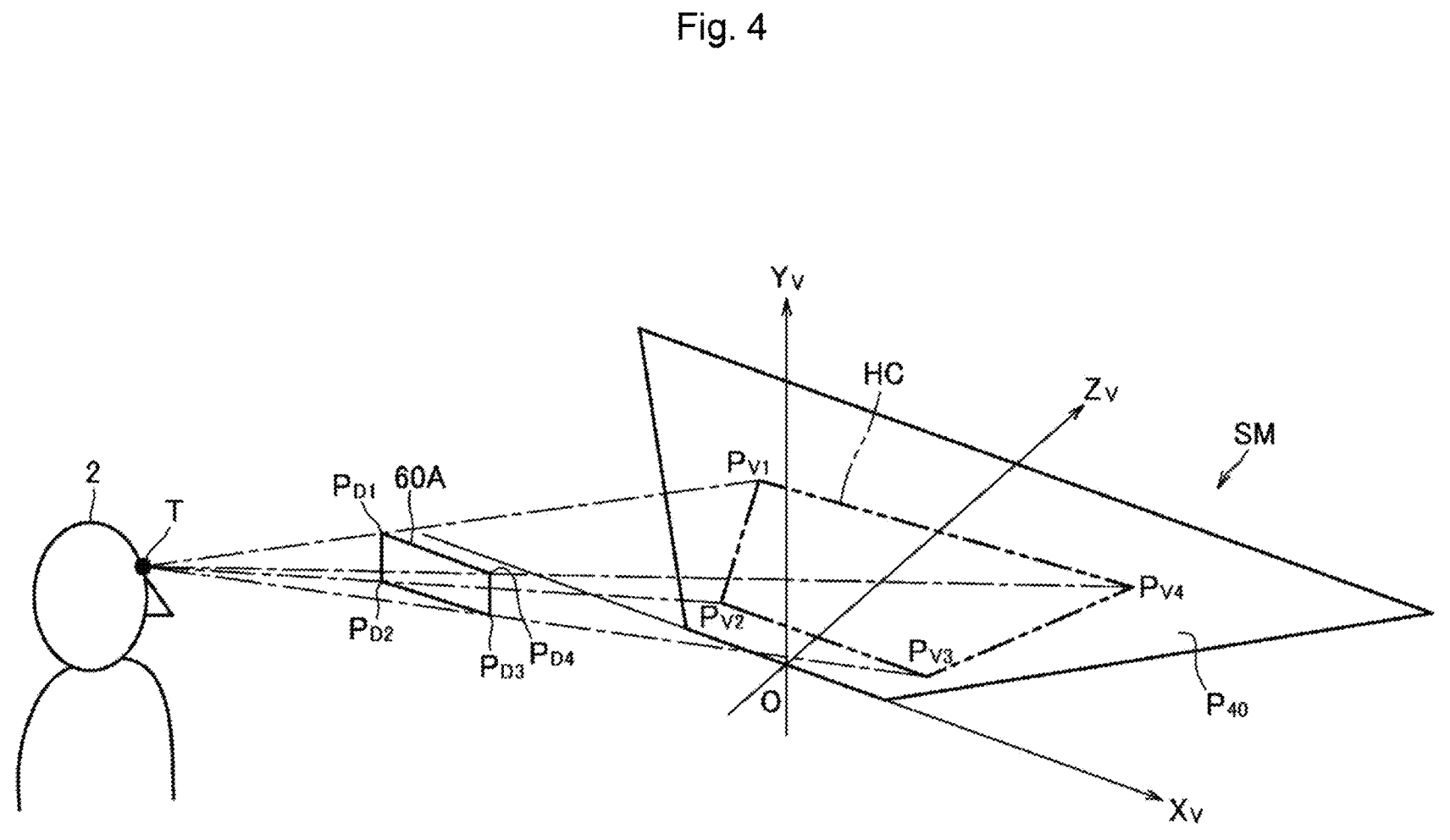

FIG. 4 is a diagram showing process details of the image deformation unit 100C.

As shown in FIG. 4, the image deformation unit 100C calculates which range on the set plane SM set in the vehicle coordinate system is projected onto the display range of the screen 60A (range bounded by coordinates $P_{D1}$ to $P_{D4}$), which is a projection surface, with reference to a projection center T. The projection center T is, for example, the eye-point coordinate PV. The image deformation unit 100C calculates coordinates $P_{V1}$ to $P_{V4}$ using the eye-point coordinate PV and coordinates $P_{D1}$ to $P_{D4}$.

A range HC bounded by the coordinates $P_{V1}$ to $P_{V4}$ is referred to as a "reference range". An image within the reference range (range HC) corresponds to the region image $R_{IMG}$ to be displayed on the screen 60A.

The image deformation unit 100C crops the region image $R_{IMG}$ corresponding to the reference range (range HC) from the exterior image $P_{40}$, and processes the cropped region image $R_{IMG}$.

A first conversion processing for converting the coordinates of the exterior image $P_{40}$ to the vehicle coordinate system with high precision and a second conversion processing for converting the coordinates of the reference range HC to the coordinate system of the screen 60A with high precision are required in order to generate the region image $R_{IMG}$ to be displayed on the screen 60A from the exterior image $P_{40}$ captured by the external camera 40.

The information required for the first conversion processing is described below.

Figure 5:
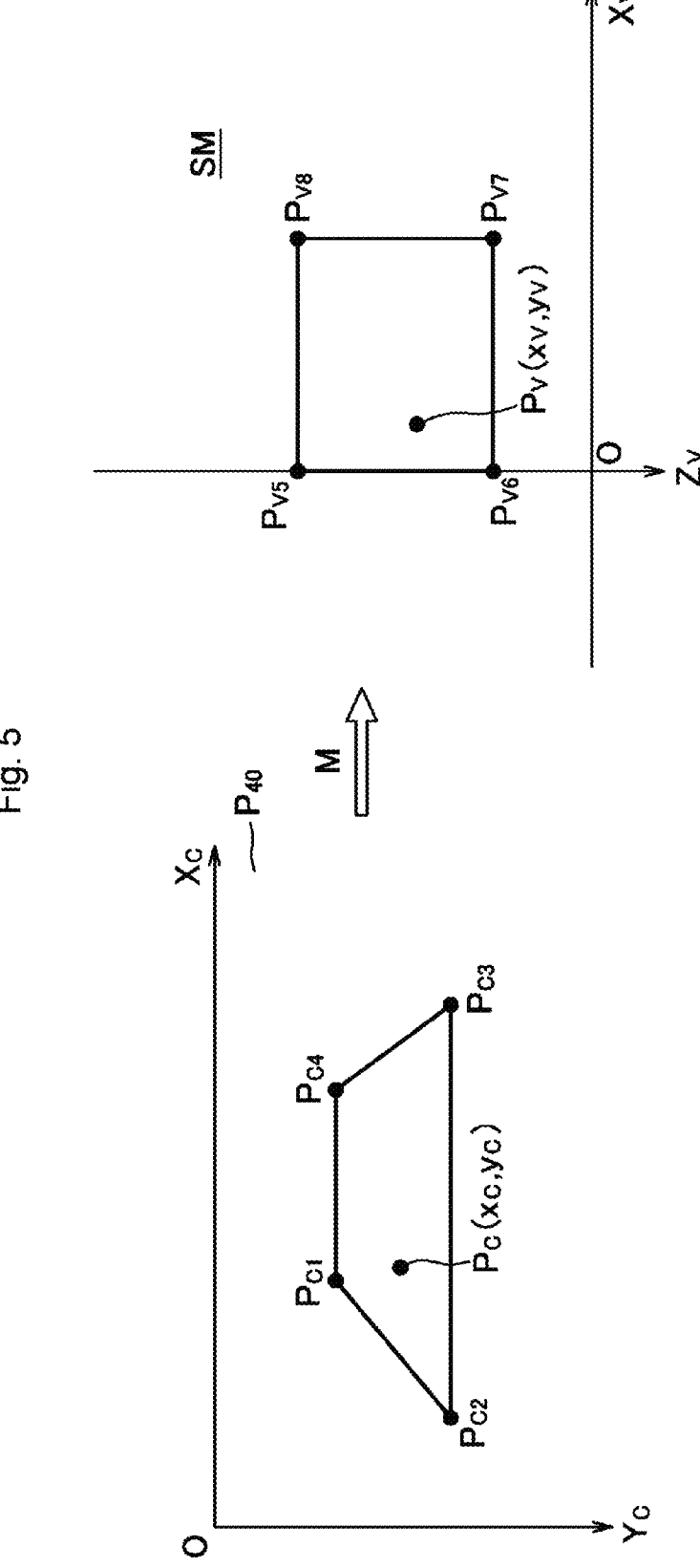
FIG. 5 is a diagram describing an operation of the image processing device according to one embodiment.

In FIG. 5, points used to calculate the projection conversion matrix M in the exterior image $P_{40}$ in the image coordinate system are indicated by points $P_{C1}$, $P_{C2}$, $P_{C3}$, and $P_{C4}$, and the homogeneous coordinates representing the coordinates ($x_C$, $y_C$) in the image coordinate system are indicated by the reference code $P_C$. In the set plane SM (plane corresponding to the ground) in the vehicle coordinate system, the points corresponding to each point $P_{C1}$ to $P_{C4}$ are indicated by points $P_{V5}$, $P_{V6}$, $P_{V7}$, and $P_{V8}$, and the homogeneous coordinates representing the coordinates ($x_V$, $z_V$) in the vehicle coordinate system are indicated by the reference code $P_V$. The points $P_{C1}$ to $P_{C4}$ and points $P_{V5}$ to PVs are used to calculate the projection conversion matrix M. The relationship between the homogeneous coordinates $P_C$ and $P_V$ is expressed by the following equation (1).

$$\begin{pmatrix} \lambda_V x_V \\ \lambda_V z_V \\ \lambda_V \end{pmatrix} = M \begin{pmatrix} x_C \\ y_C \\ 1 \end{pmatrix} \qquad \text{Equation (1)}$$

In equation (1), the reference code M represents the projection conversion matrix M for converting the coordinates of the image coordinate system into the coordinates of the vehicle coordinate system. The projection conversion matrix M is calculated, for example, by the following procedure.

The four points $P_{V5}$, $P_{V6}$, $P_{V7}$, and PVs in the vehicle coordinate system, which are points captured on the exterior image $P_{40}$, are defined and the coordinates of each point PVs to PVs are identified by actual measurement. Next, the coordinates of the four points $P_{C1}$, $P_{C2}$, $P_{C3}$, and $P_{C4}$ in the image coordinate system are identified. In this case, the coordinates of each point $P_{C1}$ to $P_{C4}$ shall be identified on the exterior image $P_{40}$. The projection conversion matrix M is calculated by substituting these identified coordinates into equation (1) and solving a simultaneous equation involving each element of the projection conversion matrix M. The calculated projection conversion matrix M is stored, for example, in the storage device 200.

The information required for the second conversion processing is described below.

Figure 6:
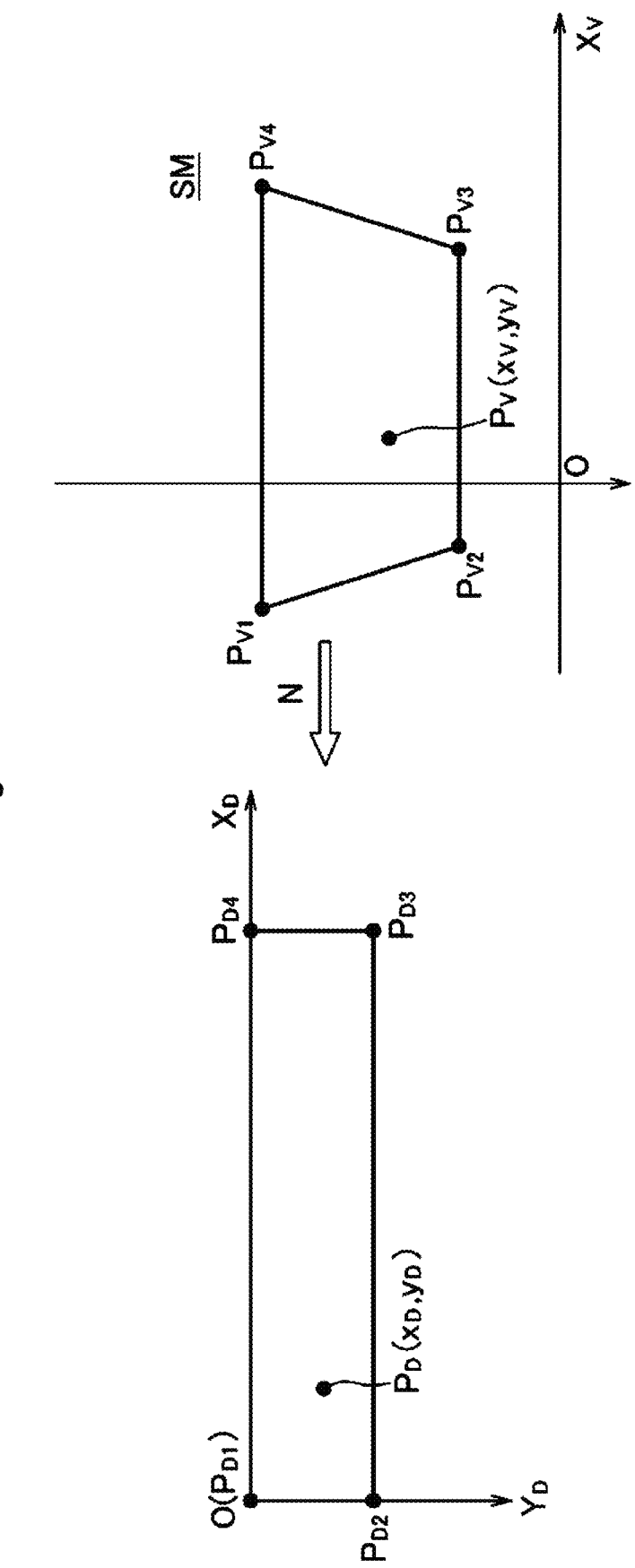
FIG. 6 is a diagram describing an operation of the image processing device according to one embodiment.

In FIG. 6, the reference range on the set plane SM in the vehicle coordinate system is a trapezoidal range indicated by the points $P_{V1}$, $P_{V2}$, $P_{V3}$, and $P_{V4}$. The homogeneous coordinates ($x_V$, $z_V$) of the vehicle coordinate system are indicated by the reference code $P_V$. In the coordinate system of the screen 60A, the points corresponding to each point $P_{V1}$ to $P_{V4}$ are indicated by the points $P_{D1}$, $P_{D2}$, $P_{D3}$, and $P_{D4}$. The homogeneous coordinates ($x_D$, $y_D$) of the coordinate system of the screen 60A are indicated by the reference code $P_D$.

In FIG. 6, the coordinate system of the screen 60A is indicated by two axes, $x_D$ on the horizontal axis and $Y_D$ on the vertical axis. The coordinate system of the screen 60A is a two-dimensional coordinate system based on the screen 60A, with the origin O in the upper left corner of the screen 60A. The unit for each axis is pixels (px). The points $P_{V1}$ to $P_{V4}$ and points $P_{D1}$ to $P_{D4}$ are used to calculate a projection conversion matrix N. The relationship between the homogeneous coordinates $P_V$ and $P_D$ is expressed by the following equation (2).

$$\begin{pmatrix} \lambda_D x_D \\ \lambda_D y_D \\ \lambda_D \end{pmatrix} = N \begin{pmatrix} \lambda_V x_V \\ \lambda_V z_V \\ \lambda_V \end{pmatrix} \qquad \text{Equation (2)}$$

In equation (2), the reference code N represents the projection conversion matrix N for converting the coordinates of the vehicle coordinate system into the coordinates of the screen 60A.

The values $\lambda_V$ and $\lambda_D$ in equations (1) and (2) indicate the magnification factor at each homogeneous coordinate $P_V$ and $P_D$. Regardless of the values $\lambda_V$ and $\lambda_D$, other than 0, each homogeneous coordinate represents the same coordinate on each coordinate system.

The product H (=MN) of the projection conversion matrix M and projection conversion matrix N becomes a projection conversion matrix that converts the coordinates ($x_C$, $y_C$) of the image coordinate system to the coordinates ($x_D$, $Y_D$) of the screen 60A. The relational expression using the projection conversion matrix H is as expressed in equation (3). By obtaining the projection conversion matrix H in advance, the coordinate conversion between the coordinates of the image coordinate system and the coordinates of the screen 60A is easily performed.

$$\begin{pmatrix} \lambda_D x_D \\ \lambda_D y_D \\ \lambda_D \end{pmatrix} = H \begin{pmatrix} x_C \\ y_C \\ 1 \end{pmatrix} \qquad \text{Equation (3)}$$

$$H = MN$$

By using the projective transformation matrices M and N, high-precision coordinate conversion is performed between the image coordinate system, the vehicle coordinate system, and the coordinate system of the screen 60A. Therefore, a highly accurate region image $R_{IMG}$ is generated from the exterior image $P_{40}$ according to the eye-point of the occupant 2. This allows the landscape that the occupant 2 sees through the front window 300 and the region image $R_{IMG}$ displayed on the screen 60A to be displayed continuously, as shown in FIG. 2. As a result, the region image $R_{IMG}$ on the screen 60A can be perceived by the occupant 2 as a natural image.

Figure 7:
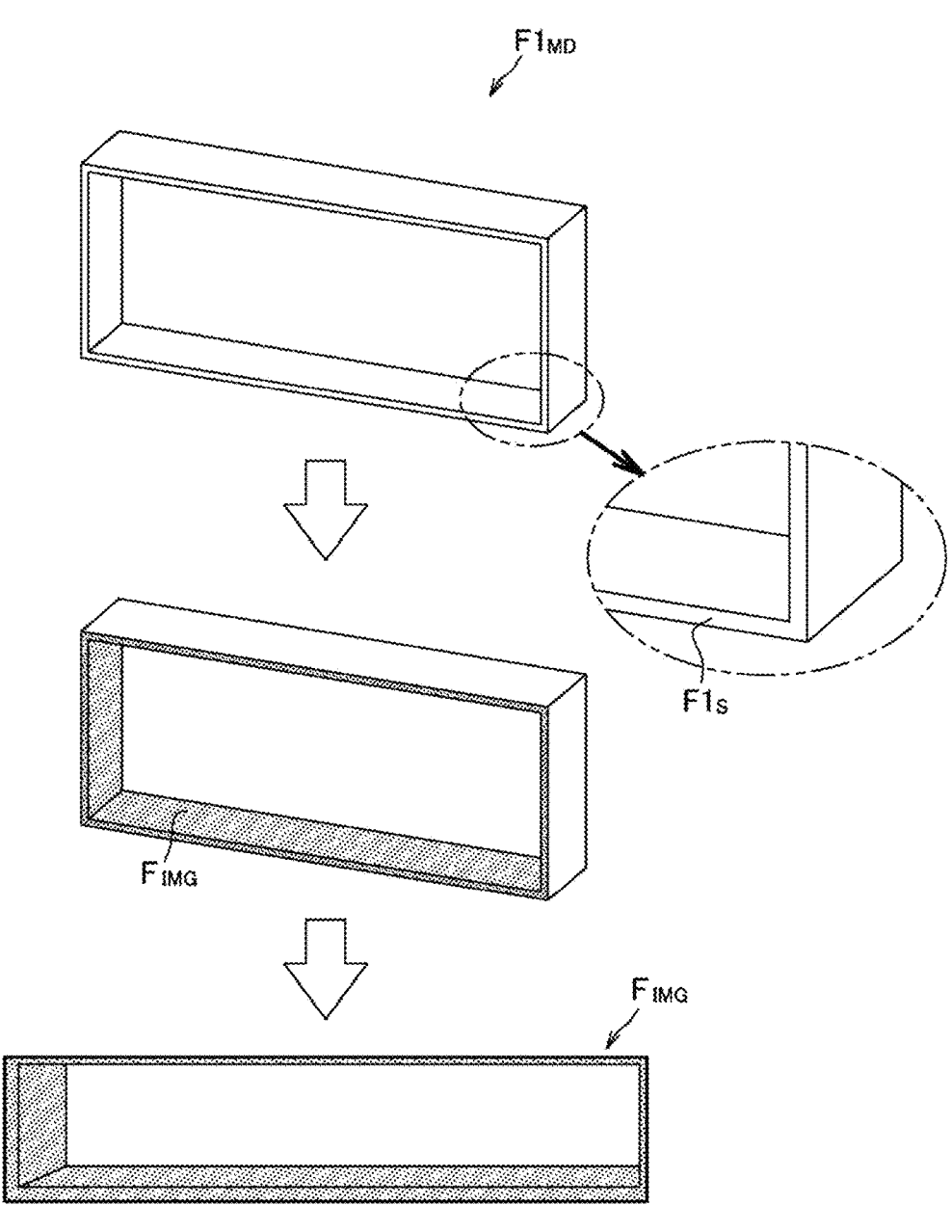
FIG. 7 is a diagram describing an operation of the image processing device according to one embodiment.

The frame drawing unit 100B arranges a window frame model $F1_{MD}$ in the vehicle coordinate system such that a frame surface $F1_S$ of the window frame model $F1_{MD}$ shown in FIG. 7 is positioned on the plane of the rectangular region (see FIG. 4) indicated by the points $P_{D1}$, $P_{D2}$, $P_{D3}$ and $P_{D4}$.

The frame drawing unit 100B sets the eye-point of the occupant 2 (eye-point coordinate $P_V$) as the eye-point when rendering the window frame model $F1_{MD}$. In other words, the frame drawing unit 100B sets the eye-point coordinate $P_V$ to the projection center T of the window frame model $F1_{MD}$ provided on the screen 60A.

The frame drawing unit 100B renders the window frame model $F1_{MD}$ only to the extent indicated by the hatching in FIG. 7. In other words, the frame drawing unit 100B renders the window frame model $F1_{MD}$ limited to the display range of the screen 60A.

The frame drawing unit 100B deforms the rendered figure (window frame image $F_{IMG}$ of the window frame model) to match the resolution of the screen 60A using a projection conversion matrix, similar to the region image $R_{IMG}$. In other words, the frame drawing unit 100B deforms the approximately parallelogram-shaped window frame image $F_{IMG}$ to match the shape of the screen 60A (rectangular in the present embodiment).

Figure 8:
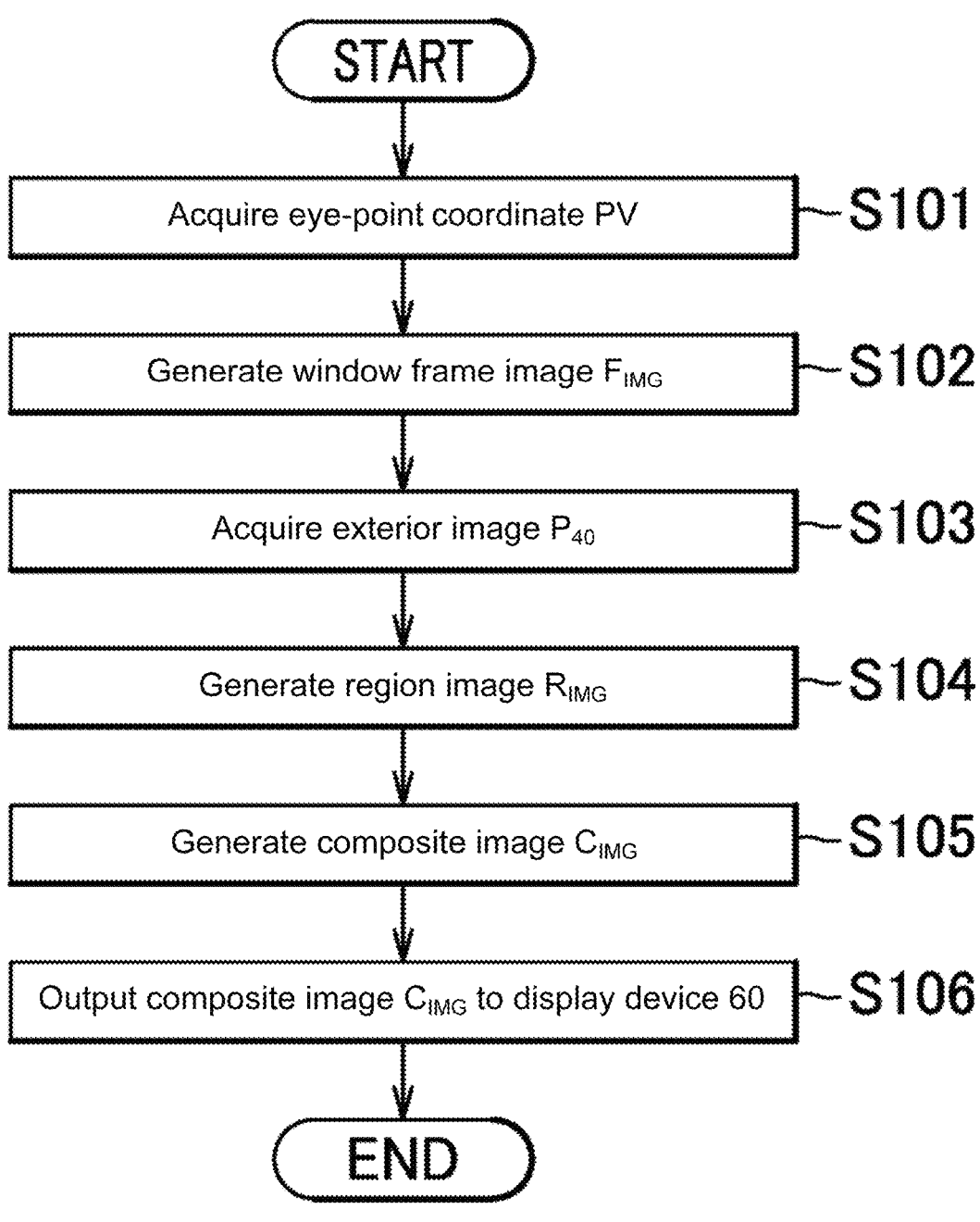
FIG. 8 is a flowchart showing image processing steps executed by a processor of the image processing device in one embodiment.

FIG. 8 is a flowchart showing image processing executed by the processor 100. For example, when the display control system 1 starts up, the system begins executing the image processing shown in FIG. 8. The image processing is repeated at a prescribed rate (e.g., n times per second) until, for example, the display control system 1 stops.

Note that the embodiments are not limited by the manner in which the processing units of the flowchart are divided or names thereof. Furthermore, the order of processing in the flowchart is also not limited to the shown example.

As shown in FIG. 8, the processor 100 acquires the eye-point coordinate $P_V$ of the occupant 2 detected by the DMS 30 (step S101).

Thus, in step S101, the processor 100 operates as 3D-point information acquisition unit to acquire the eye-point coordinate $P_V$ of the occupant 2 (an example of information on the eye position of the occupant).

The processor 100 generates the window frame image $F_{IMG}$ (step S102), as exemplarily described using FIGS. 4 and 7. In other words, the processor 100 generates a projection image of the window frame model when the screen 60A is the projection surface (projection image of the window frame model on the screen 60A, with the eye-point coordinate $P_V$ as the projection center T).

Thus, in step S102, the processor 100 operates as a projection image generation unit to generate a projection image (window frame image $F_{IMG}$) of the window frame model (example of a 3D model having an opening) as viewed from the eye-point of the occupant 2 at a position on the screen 60A.

The processor 100 acquires the exterior image $P_{40}$ captured by the external camera 40 (step S103).

Thus, in step S103, the processor 100 operates as an image acquisition unit to acquire the exterior image $P_{40}$ of the outside (example of an outside image) of the vehicle (example of a mobile body).

The processor 100 generates the region image $R_{IMG}$ based on the exterior image $P_{40}$ (step S104), as exemplarily described using FIGS. 3 to 6. In other words, the processor 100 crops the region image $R_{IMG}$ to be displayed on the screen 60A from the exterior image $P_{40}$ acquired in step S103 according to the eye-point coordinate $P_V$ acquired in step S101, and deforms the cropped region image $R_{IMG}$ to match the shape of the screen 60A (rectangular in the present embodiment).

Thus, in step S104, the processor 100 operates as a cropping unit to crop the region image $R_{IMG}$ of the region to be displayed on the screen 60A from the exterior image $P_{40}$ (example of an outside image) according to the eye-point coordinate $P_V$ of the occupant 2 (example of occupant eye-point information).

In step S104, the processor 100 may not crop the region image $R_{IMG}$ covering the entire area of the screen 60A from the exterior image $P_{40}$, but may, for example, crop from the exterior image $P_{40}$ only a region that fits into the opening OP of the window frame image $F_{IMG}$. In the latter case, the image processing target is limited to the region (opening OP) enclosed by the window frame imitated by the window frame image $F_{IMG}$, rather than a size corresponding to the entire area of the screen 60A. Therefore, compared to the former, the processing burden on the processor 100 when generating the region image $R_{IMG}$ is reduced.

The processor 100 generates the composite image $C_{IMG}$ (step S105). In other words, the processor 100 composites the region image $R_{IMG}$ and the window frame image $F_{IMG}$ such that the region image $R_{IMG}$ generated in step S104 appears in the opening OP of the window frame image $F_{IMG}$ generated in step S102.

Thus, in step S105, the processor 100 operates as an image compositing unit to composite the region image $R_{IMG}$ and the window frame image $F_{IMG}$ such that the region image $R_{IMG}$ appears in the opening OP of the window frame image $F_{IMG}$ (example of a projection image) on the screen 60A.

The processor 100 outputs the composite image $C_{IMG}$ generated in step S105 to the display device 60 (step S106). As a result, the composite image $C_{IMG}$, which is a composite of the region image $R_{IMG}$ and the window frame image $F_{IMG}$, is displayed on the screen 60A of the display device 60, as shown in FIG. 2.

Thus, in step S106, the processor 100 operates as an image output unit that outputs the composite image $C_{IMG}$ to the display device 60.

During the execution of the image processing shown in FIG. 8, if the eye-point coordinate $P_V$ moves, for example, due to the occupant 2 moving their body, the landscape outside the vehicle (region image $R_{IMG}$) on the screen 60A changes in real-time according to the movement of the eye-point coordinate $P_V$, in conjunction with the projection angle of the window frame image $F_{IMG}$ which also changes in real-time. Therefore, the occupant 2 can intuitively understand the relationship between the eye position and display image, and can intuitively and easily adjust the position of their eye such that the image of the outside they wish to see is visible via the screen 60A. The occupant 2 can experience a state of viewing the outside of the vehicle via the window frame on the dashboard.

Figure 9:
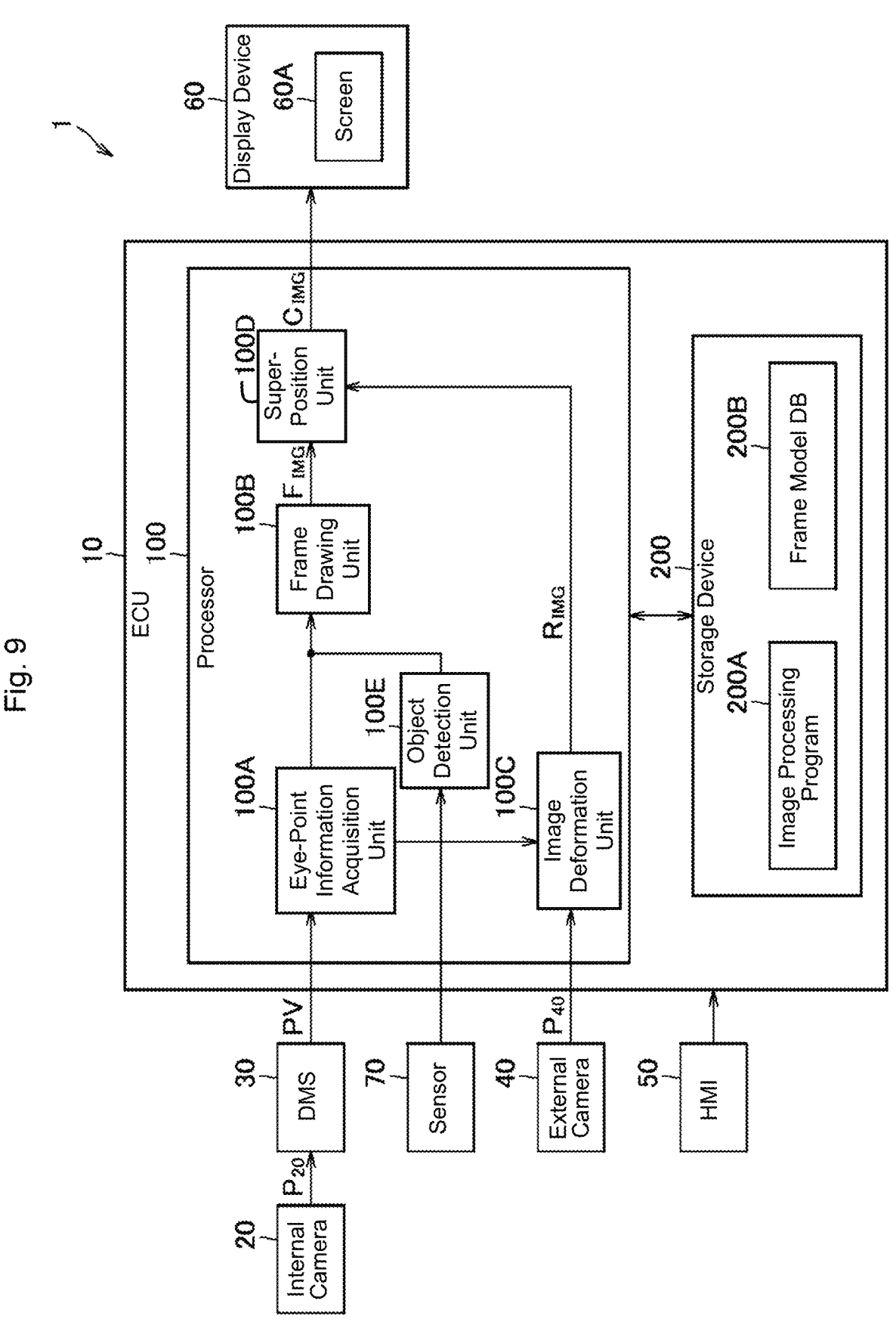
FIG. 9 is a block diagram showing a configuration of a display control system according to Modified Example 1.

FIG. 9 is a block diagram showing a configuration of the display control system 1 according to Modified Example 1.

As shown in FIG. 9, the display control system 1 according to Modified Example 1 is provided with a sensor 70. The sensor 70 detects an object (people, object, and the like. Hereinafter referred to as "object") a vehicle periphery, and examples includes cameras, millimeter wave radar, quasi-millimeter wave radar, ultrasonic sensors, and LiDAR (Light Detection and Ranging).

As shown in FIG. 9, the ECU 10 according to Modified Example 1 is provided with an object detection unit 100E. The object detection unit 100E detects an object in the vehicle periphery based on information input from the sensor 70.

In Modified Example 1, as in the embodiment above, the processor 100 acquires the eye-point coordinate $P_V$ (step S101), generates the window frame image $F_{IMG}$ (step S102), acquires the exterior image $P_{40}$ (step S103), generates the region image $R_{IMG}$ (step S104), generates the composite image $C_{IMG}$ (step S105), and outputs the composite image $C_{IMG}$ to the display device 60 (step S106).

Figure 10:
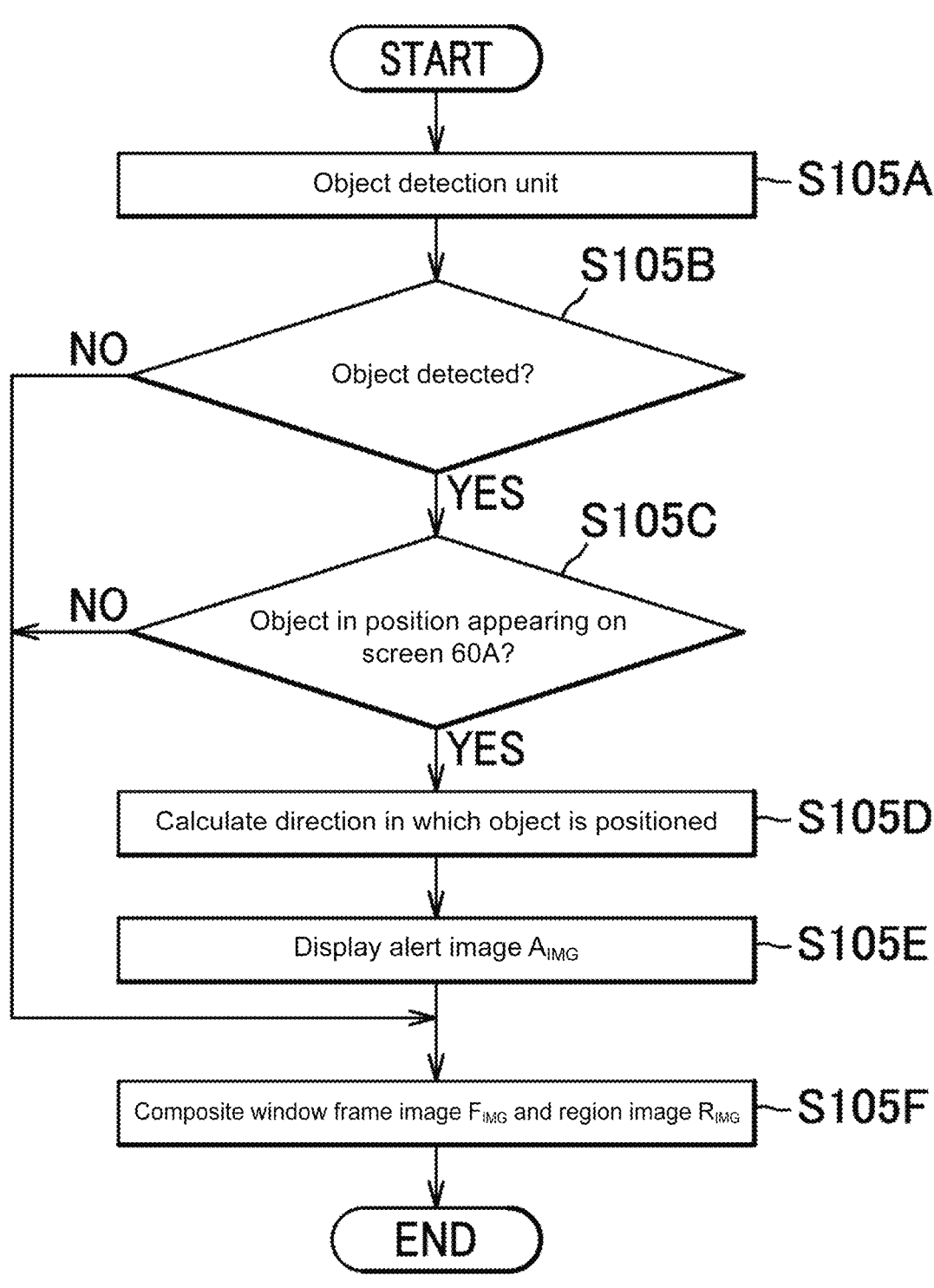
FIG. 10 is a flowchart showing a subroutine of a composite image generation processing step (S105 in FIG. 8) executed by a processor in Modified Example 1.

FIG. 10 is a diagram showing a subroutine for the generation processing of the composite image $C_{IMG}$ (step S105) executed by the processor 100 in Modified Example 1.

As shown in FIG. 10, the processor 100 detects an object in the vehicle periphery based on the information input from the sensor 70 (step S105A).

Thus, in step S105A, the processor 100 operates as an object detection unit to detect an object in the vehicle periphery.

If no objects are detected in the vehicle periphery (step S105B: NO), the processor 100 composites the region image $R_{IMG}$ and the window frame image $F_{IMG}$ such that the region image $R_{IMG}$ generated in step S104 appears in the opening OP of the window frame image $F_{IMG}$ generated in step S102 (step S105F).

If an object in the vehicle periphery is detected (step S105B: YES), the processor 100 determines whether or not the object is located in a position that does not appear on the screen 60A (step S105C).

If a plurality of objects are detected in the vehicle periphery, in step S105C, the processor 100 selects one object from the plurality of objects that should be given the highest priority for warning, and determines whether or not the selected object is located in a position that does not appear on the screen 60A. As an example, the processor 100 selects the object closest to a vehicle body as the object with the highest priority for warning.

If the object is located in a position appearing on the screen 60A (step S105C: NO), the processor 100 composites the region image $R_{IMG}$ and the window frame image $F_{IMG}$ such that the region image $R_{IMG}$ generated in step S104 appears in the opening OP of the window frame image $F_{IMG}$ generated in step S102 (step S105F).

If the object is located in a position that does not appear on the screen 60A (step S105C: YES), the processor 100 calculates the direction in which the object is positioned (step S105D).

Figure 11:
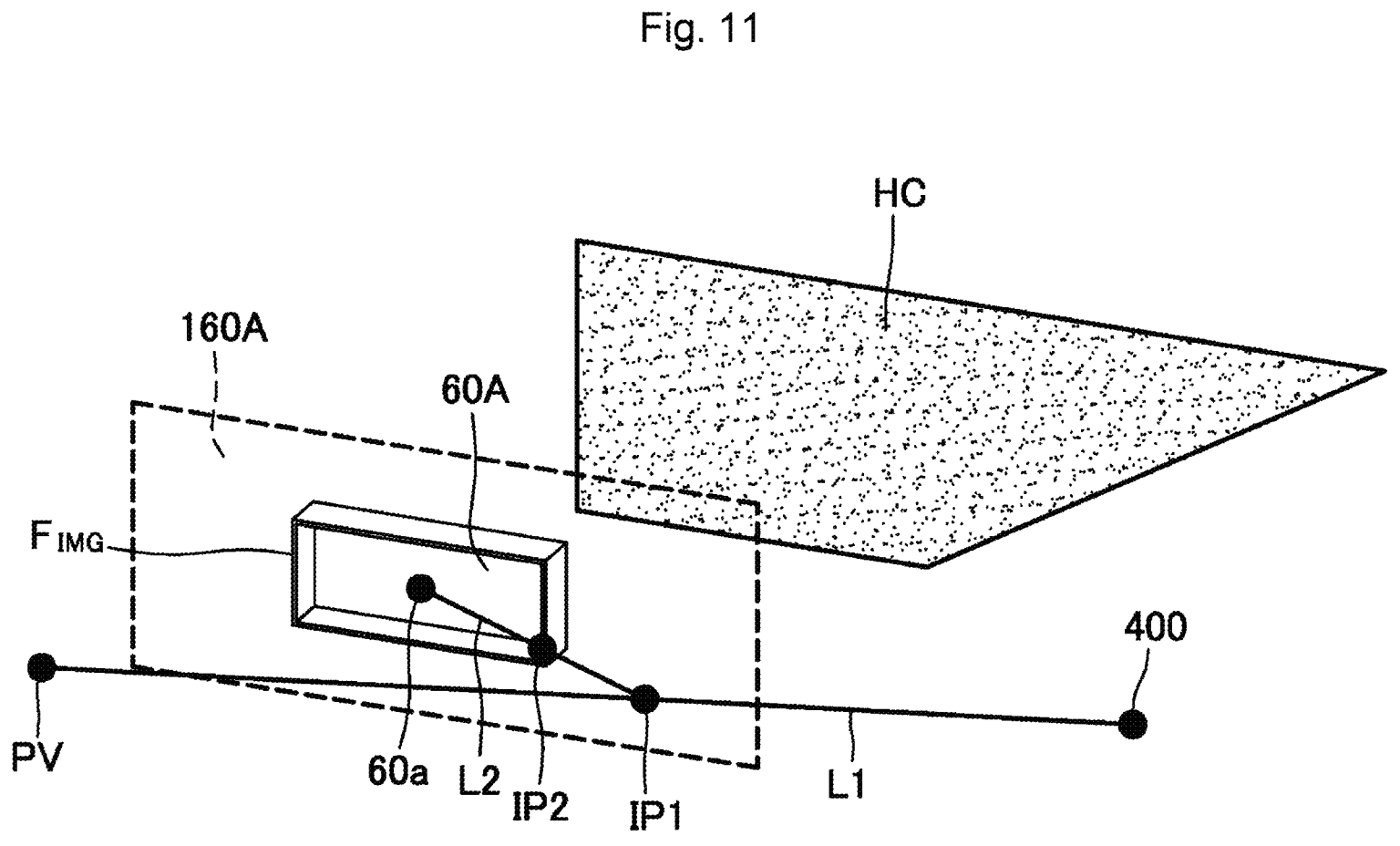

FIG. 11 is a diagram supplementing a description of the processes of steps S105C to S105D. In FIG. 11, the reference code 400 represents a coordinate of the object in the vehicle periphery detected by the object detection unit 100E.

The processor 100 determines whether the object is positioned outside the screen 60A based on whether the coordinate 400 of the object detected by the object detection unit 100E is positioned outside the reference range HC. If the coordinate 400 of the object is positioned outside the reference range HC, the processor 100 determines that the object is in a position that does not appear on the screen 60A. If the coordinate 400 of the object is positioned inside the reference range HC, the processor 100 determines that the object is in a position appearing on the screen 60A.

If the coordinate 400 of the object is positioned outside the reference range HC, the processor 100 calculates an intersection IP1 of a line segment L1 connecting the eye-point coordinate $P_V$ and the coordinate 400 with an extended plane 160A. The extended plane 160A is an extended plane of the screen 60A and is a virtual plane that includes the screen 60A.

The processor 100 calculates a position IP2 where the window frame image $F_{IMG}$ intersects a line segment L2 connecting the center 60a of the screen 60A and the intersection IP1 on the extended plane 160A. The position IP2 indicates the direction in which the object detected by the object detection unit 100E is positioned.

The processor 100 displays an alert image $A_{IMG}$ at the position IP2 in the window frame image $F_{IMG}$ (step S105E). By way of example, the processor 100 colors the position IP2 a different color from other portions of the window frame image $F_{IMG}$ such that the occupant 2 can visually recognize the position IP2.

The alert image $A_{IMG}$ may be, for example, an image showing object information. For example, if the sensor 70 is a camera, the alert image $A_{IMG}$ may be a real-time video of the object detected by the object detection unit 100E. This video is displayed on the screen 60A, for example, picture-in-picture. In other words, the video is displayed in a region of the screen 60A that is closer to the direction where the object detected by the object detection unit 100E is positioned.

The alert image $A_{IMG}$ may be an image or video that guides the line of sight of the occupant 2 to the position IP2. By way of example, the alert image $A_{IMG}$ is an arrow image that gradually moves from the center 60a of the screen 60A to position IP2.

Thus, in step S105E, the processor 100 operates as an alert display unit for displaying an alert at the position IP2 (example of a portion of the frame corresponding to the direction in which the object is positioned) if the object detected by the object detection unit is located at a position that does not appear in the region image $R_{IMG}$.

The processor 100 composites the region image $R_{IMG}$ and the window frame image $F_{IMG}$ such that the region image $R_{IMG}$ generated in step S104 appears in the opening OP of the window frame image $F_{IMG}$ containing the alert image $A_{IMG}$, the window frame image $F_{IMG}$ being generated in step S105E (step S105F).

Figure 12:
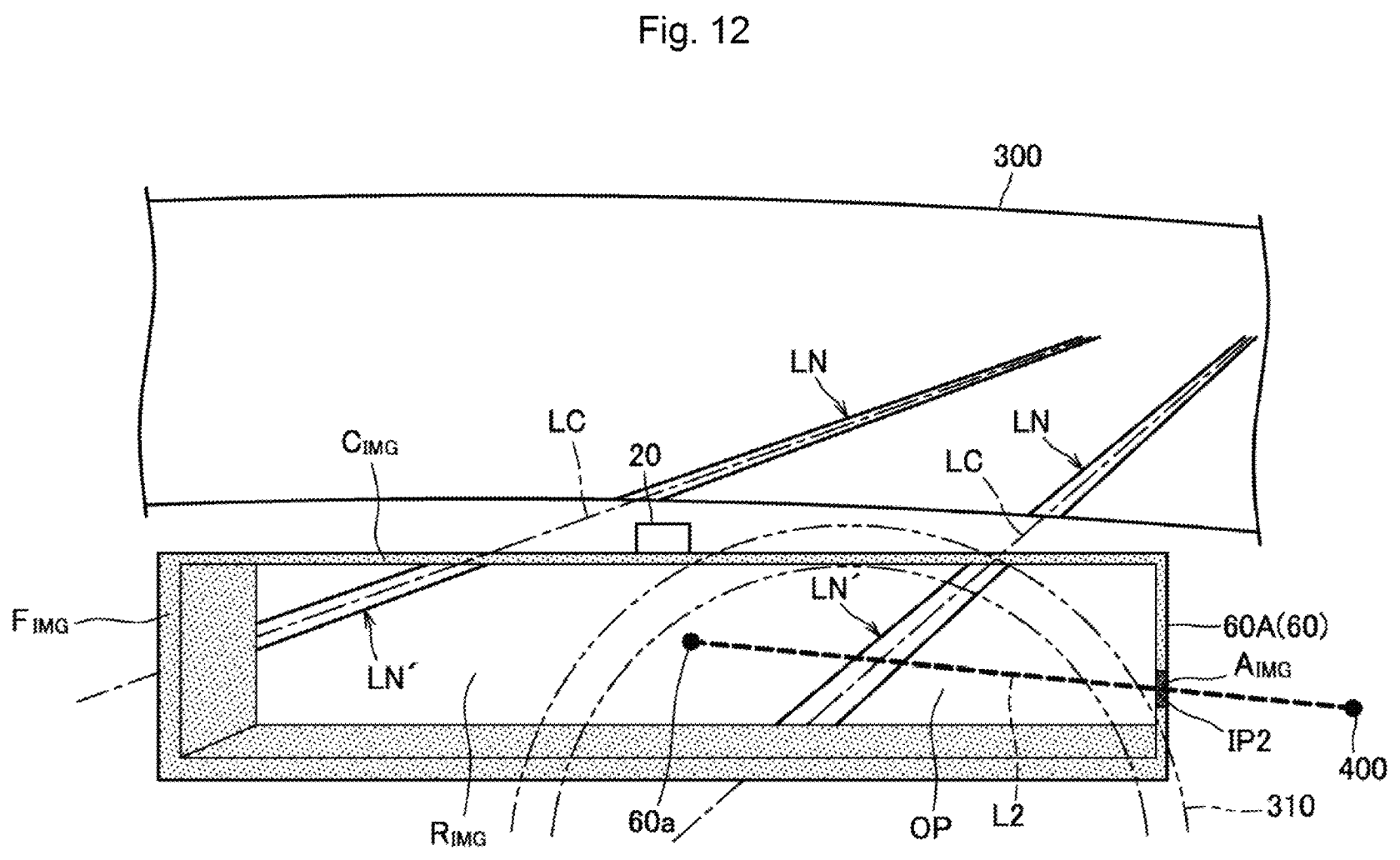

FIG. 12 is a diagram showing a part of a vehicle interior as viewed from the occupant 2 in Modified Example 1. In Modified Example 1, the occupant 2 can grasp the presence of an object that requires attention in driving via the alert image $A_{IMG}$ shown in FIG. 12.

Next, a description of the Modified Example 2 will be provided.

In Modified Example 2, as in the embodiment above, the processor 100 acquires the eye-point coordinate $P_V$ (step S101), generates the window frame image $F_{IMG}$ (step S102), acquires the exterior image $P_{40}$ (step S103), generates the region image $R_{IMG}$ (step S104), generates the composite image $C_{IMG}$ (step S105), and outputs the composite image $C_{IMG}$ to the display device 60 (step S106).

Figure 13:
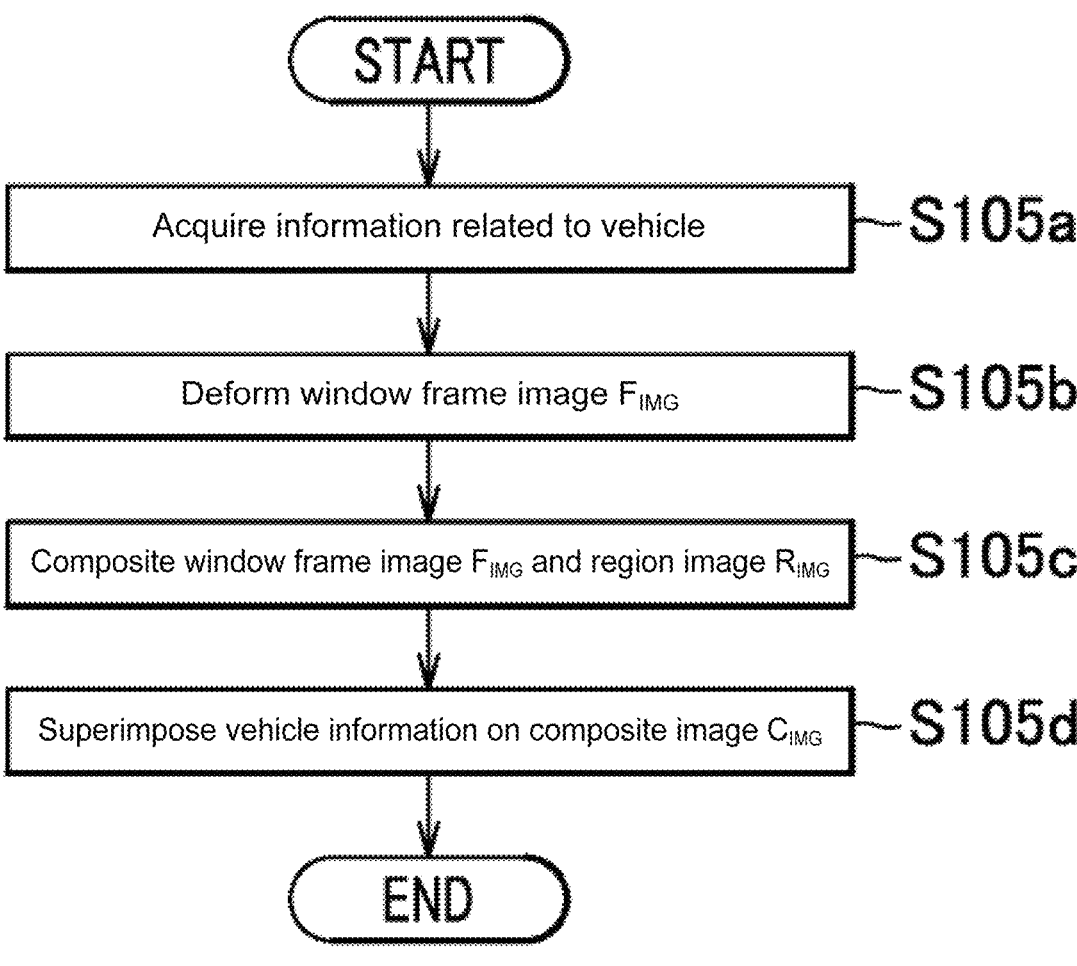
FIG. 13 is a flowchart showing a subroutine of composite image generation processing step (S105 in FIG. 8) executed by a processor in Modified Example 2.

FIG. 13 is a flowchart showing a subroutine for the generation processing of the composite image $C_{IMG}$ (step S105) executed by the processor 100 in Modified Example 2.

As shown in FIG. 13, the processor 100 acquires information related to vehicle (step S105a). Information related to the vehicle is, for example, the speed of the vehicle as detected by a vehicle speed sensor. Information related to the vehicle is not limited to the speed of the vehicle, but may be other information acquired, for example, using instruments provided on the vehicle. Hereafter, information related to the vehicle shall be noted as "vehicle information" for convenience.

Thus, in step S105a, the processor 100 operates as an information acquisition unit to acquire information related to the mobile body.

The processor 100 deforms the window frame image $F_{IMG}$ according to the vehicle information acquired in step S105a (step S105b). By way of example, the processor 100 widens a part of the window frame image $F_{IMG}$ such that vehicle information can be displayed superimposed on the window frame image $F_{IMG}$.

Thus, in step S105b, the processor 100 operates as a shape deformation unit for deforming the window frame image $F_{IMG}$ (example of a projection image) according to the information acquired by the information acquisition unit.

The processor 100 composites the region image $R_{IMG}$ and the window frame image $F_{IMG}$ such that the region image $R_{IMG}$ generated in step S104 appears in the opening OP of the window frame image $F_{IMG}$, in which the shape thereof was deformed in step S105b (step S105c).

The processor 100 superimposes the vehicle information acquired in step S105a on the composite image $C_{IMG}$ generated in step S105c (step S105d).

Thus, in step S105d, the processor 100 operates as a superposition unit that superimposes the information acquired by the information acquisition unit onto the composite image $C_{IMG}$. In other words, the processor 100 operating as the superposition unit superimposes the information acquired in step S105a on the window frame image $F_{IMG}$ (example of a projection image) after deformation by the shape deformation unit, which is included in the composite image $C_{IMG}$.

Figure 14:
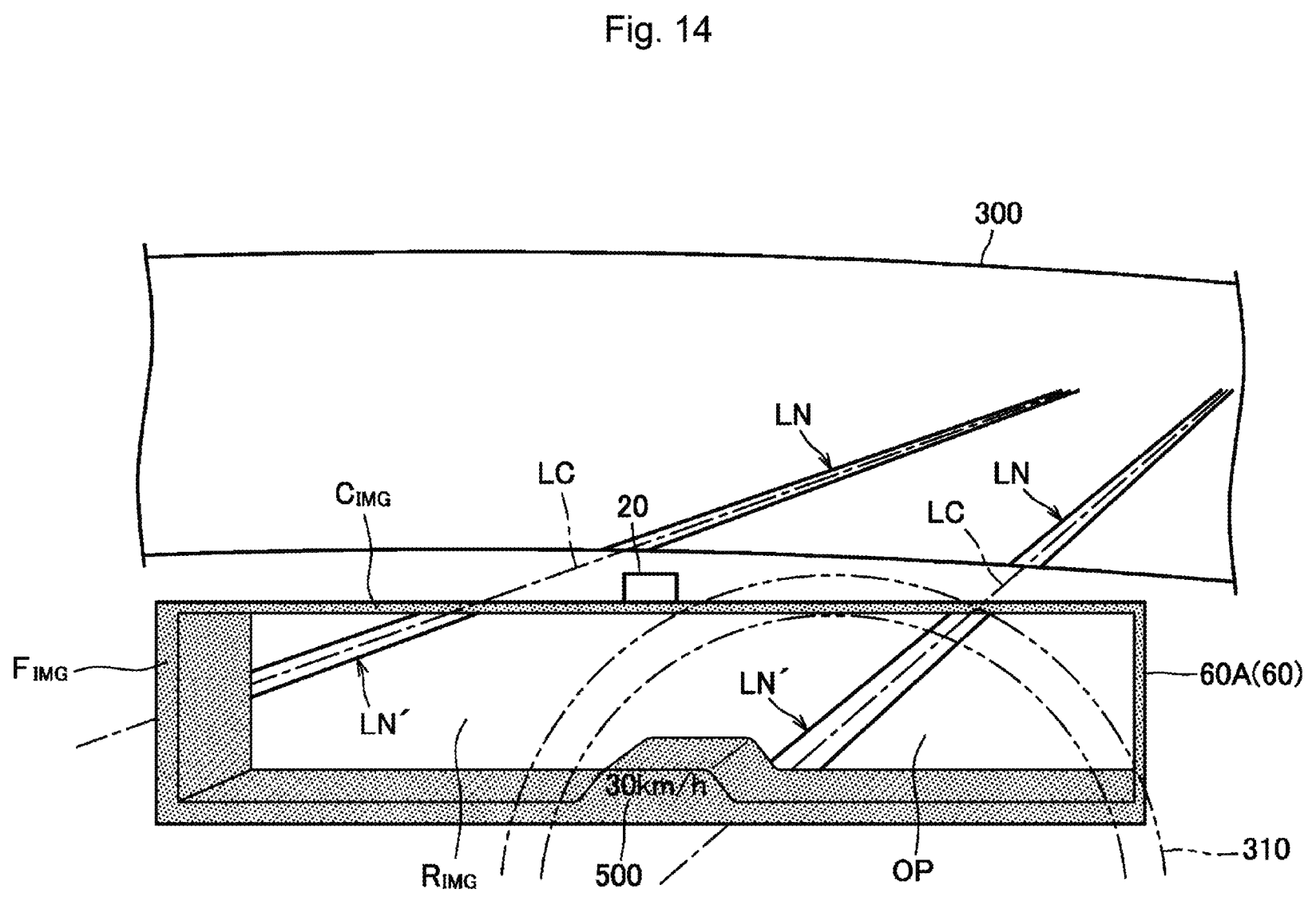

FIG. 14 is a diagram showing a part of the vehicle interior as viewed from the occupant 2 in Modified Example 2. In FIG. 14, reference code 500 represents an example of vehicle information superimposed on the composite image $C_{IMG}$. The occupant 2 can check the vehicle speed and other vehicle information via the screen 60A.

When displaying a plurality of pieces of vehicle information, the processor 100 may deform a plurality of pieces of the window frame image $F_{IMG}$ and display the vehicle information at each of the pieces. The occupant 2 can operate the HMI 50 to set the type of vehicle information to be displayed, the display position of various vehicle information, the display timing of various vehicle information, and the like, as appropriate.

In Modified Example 2, the shape of the window frame image $F_{IMG}$ is deformed according to the vehicle information, but the configuration of the present invention is not limited thereto. The shape of the window frame image $F_{IMG}$ may be a pre-defined shape with a space to display vehicle information. By way of example, the shape of the window frame image $F_{IMG}$ may be shaped to assume the display of a speedometer or various indicators.

For example, the occupant 2 may touch the vehicle information displayed on the screen 60A to perform an interactive operation with respect to the vehicle.

The above is a description of an exemplary embodiment of the present application. The embodiments of the present invention are not limited to those described above, and various modifications are possible within the scope of the technical concept of the present invention. For example, appropriate combinations of embodiments and the like that are explicitly indicated by way of example in the specification or obvious embodiments and the like are also included in the embodiments of the present application.

For example, the installation position of the display device 60 is not limited to the dashboard. The display device 60 may be installed, for example, in a pillar part.

The display contents on the screen 60A is not limited to the image in front of the vehicle, but is dependent on the positional relationship between the display device 60 and the occupant 2. For example, when the display device 60 is positioned to the side of the occupant 2, an image including the side of the vehicle is displayed on the screen 60A. Furthermore, when the display device 60 is positioned behind the occupant 2, an image including the rear of the vehicle is displayed on the screen 60A.

The ECU 10 may be connected to a plurality of external cameras 40 installed at different positions on the vehicle body. The exterior image $P_{40}$ may, for example, be a combination of the captured images from each of a front camera capturing the front of the vehicle and a pair of left and right side cameras of the vehicle capturing the sides of the vehicle. In this case, the processor 100 can acquire an exterior image $P_{40}$ of a wide range that cannot be captured by the front camera, for example.

The exterior image $P_{40}$ is not limited to a real-time captured image, but may be, for example, a past captured image.

The window frame image $F_{IMG}$ may change in color, texture, or the like. By way of example, the window frame image $F_{IMG}$ may be drawn such that the shading changes in real-time according to the position of a light source such as the sun or the like.

REFERENCE NUMERALS USED IN THE DRAWINGS

1. Display control system
10: ECU
20: Internal camera
30: DMS
40: External camera
50: HMI
60: Display device
70: Sensor
100: Processor
100A: Eye-point information acquisition unit
100B: Frame drawing unit
100C: Image deformation unit
100D: Superposition unit
100E: Object detection unit
200: Storage device
200A: Image processing program

What is claimed is:

1. An image processing device, comprising:
   a 3D-point information acquisition unit that acquires information on a position of an eye of an occupant of a mobile body;
   an image acquisition unit that acquires an outside image of the outside of the mobile body;
   a cropping unit that crops a region image of a region displayed on a screen of a display device provided in the mobile body from the outside image acquired from the image acquisition unit, based on the eye position information;
   a projection image generation unit that generates a projection image of a 3D model having an opening, as viewed from the position of the eye on the screen;
   an image compositing unit that composites the region image and the projection image such that the region image appears in the opening of the projection image on the screen; and
   an image output unit that outputs a composite image of the image compositing unit to the display device.

2. The image processing device according to claim 1, wherein the 3D model imitates a frame enclosing the screen, and the projection image generation unit deforms the shape of the frame to match the shape of the screen.

3. The image processing device according to claim 2, further comprising:
   an object detection unit that detects an object in a periphery of the mobile body; and
   an alert display unit that displays an alert in a portion of the frame corresponding to a direction in which the object is positioned when the object detected by the object detection unit is in a position not appearing in the region image.

4. The image processing device according to claim 1, wherein the cropping unit:
   crops a projection range of the outside image projected on the screen as the region image when the eye position is set as the projection center; and
   deforms the region image to match the shape of the screen.

5. The image processing device according to claim 1, wherein the outside image is an image of the outside of the mobile body on an opposite side from the occupant across the display device and is captured by an image capture device provided with a wide-angle lens.

6. The image processing device according to claim 1, further comprising:

an information acquisition unit that acquires information related to the mobile body; and a superposition unit that superimposes the information acquired by the information acquisition unit on the composite image, wherein the image output unit outputs the composite image on which the information is superimposed by the superposition unit to the display device.

7. The image processing device according to claim 6, further comprising:

a shape deformation unit that deforms the projection image according to the information acquired by the information acquisition unit, wherein the superposition unit superimposes the information on the projection image after being deformed by the shape deformation unit, which is included in the composite image.

8. An image processing method, comprising the steps of:

acquiring information on a position of an eye of an occupant of a mobile body;

acquiring an outside image of the outside of the mobile body;

cropping a region image of a region displayed on a screen of a display device provided in the mobile body from the acquired outside image, based on the eye position information;

generating a projection image of a 3D model having an opening, as viewed from the position of the eye on the screen;

compositing the region image and the projection image such that the region image appears in the opening of the projection image on the screen; and outputting a composite image of the region image and projection image to the display device.

9. The image processing method according to claim 8, wherein the 3D model imitates a frame enclosing the screen, and the shape of the frame is deformed to match the shape of the screen to generate the projection image in the step of generating the projection image.

10. The image processing method according to claim 9, further comprising the steps of:

detecting an object in a periphery of the mobile body; and displaying an alert in a portion of the frame corresponding to a direction in which the object is positioned when the detected object is in a position not appearing in the region image.

11. The image processing method according to claim 8, wherein the region image is cropped in the step of cropping the region image by cropping a projection range of the outside image projected on the screen as the region image when the eye position is set as the projection center, and deforming the region image to match the shape of the screen.

12. The image processing method according to claim 8, wherein the outside image is an image of the outside of the mobile body on an opposite side from the occupant across the display device and is captured by an image capture device provided with a wide-angle lens.

13. The image processing method according to claim 8, further comprising the steps of:

acquiring information related to the mobile body; and superimposing the information related to the mobile body on the composite image, wherein the composite image on which the information related to the mobile body is superimposed is output to the display device in the step of outputting the composite image.

14. The image processing method according to claim 13, further comprising the step of:

deforming the projection image according to the eye position information, wherein the information related to the mobile body is superimposed on the projection image after being deformed, which is included in the composite image in the step of superimposing the information related to the mobile body in the composite image.

* * * * *